US006103864A

United States Patent [19]

Alston et al.

[11] Patent Number: 6,103,864

[45] Date of Patent: Aug. 15, 2000

[54] COMPOSITION AND PROCESS FOR RETARDING THE PREMATURE AGING OF PMR MONOMER SOLUTIONS AND PMR PREPREGS

[75] Inventors: William B. Alston, Medina; Gloria S. Gahn, Columbia Station, both of Ohio

[73] Assignee: The United States of America as represented by the Administrator of the National Aeronautics and Space Administration, Washington, D.C.

[21] Appl. No.: 09/231,890

[22] Filed: Jan. 14, 1999

[51] Int. Cl.$^7$ .......................... C08G 73/10; C08G 69/26

[52] U.S. Cl. .......................... 528/353; 528/126; 528/128; 528/172; 528/173; 528/174; 528/179; 528/183; 528/188; 528/220; 528/229; 528/288; 528/350; 528/352; 528/125; 428/357; 428/394; 428/395; 428/396; 264/331.19; 264/331.21

[58] Field of Search .......................... 528/353, 125, 528/126, 128, 172–173, 174, 179, 183, 188, 220, 229, 288, 350, 352; 428/357, 395, 394, 396; 264/331.19, 331.21

[56] References Cited

U.S. PATENT DOCUMENTS

| | | | |
|---|---|---|---|
| 3,697,345 | 10/1972 | Lubowitz | 156/15 |
| 3,708,459 | 1/1973 | Lubowitz | 528/229 |
| 3,745,149 | 7/1973 | Serafini et al. | 260/65 |
| 5,041,526 | 8/1991 | Riel et al. | 528/353 |
| 5,041,527 | 8/1991 | Riel et al. | 528/353 |
| 5,041,528 | 8/1991 | Riel et al. | 528/353 |
| 5,091,505 | 2/1992 | Serafini et al. | 528/353 |
| 5,171,822 | 12/1992 | Pater | 528/188 |
| 5,175,241 | 12/1992 | Darrow | 528/128 |
| 5,338,827 | 8/1994 | Serafini et al. | 528/353 |
| 5,770,676 | 6/1998 | Pater et al. | 528/353 |

*Primary Examiner*—P. Hampton-Hightower
*Attorney, Agent, or Firm*—Kent N. Stone

[57] ABSTRACT

The polyimides are derived from solutions of at least one low-boiling organic solvent, e.g. isopropanol containing a mixture of polyimide-forming monomers. The monomeric solutions have an extended shelf life at ambient (room) temperatures as high as 80° C. and consist essentially of a mixture of monoalkyl ester-acids, alkyl diester-diacids and aromatic polyamines wherein the alkyl radicals of the ester-acids are derived from lower molecular weight aliphatic secondary alcohols having 3 to 5 carbon atoms per molecule such as isopropanol, secondary butanol, 2-methyl-3-butanol, 2 pentanol or 3-pentanol. The solutions of the polyimide-forming monomers have a substantially improved shelf-life and are particularly useful in the aerospace and aeronautical industry for the preparation of polyimide reinforced fiber composites such as the polyimide cured carbon composites used in jet engines, missiles, and for other high temperature applications.

40 Claims, No Drawings

COMPOSITION AND PROCESS FOR RETARDING THE PREMATURE AGING OF PMR MONOMER SOLUTIONS AND PMR PREPREGS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

This invention relates to stable organic solutions of polyimide-forming monomers having improved shelf-life and more specifically to the process of manufacturing, shipping, handling, storage and the fabrication layup of all types of PMR (polymerization of monomeric reactants) polyimide-forming monomeric solutions and the PMR polyimide prepregs derived therefrom without adversely affecting subsequent processability at cure temperature of the PMR resins and PMR composites.

2. Description of Related Prior Art

Polymerization of Monomer Reactants (PMR) to obtain polyimides is an important class of ultra high performance composite resins. Polyimide graphite fiber reinforced composites are increasingly used in various aircraft engine components, which operate at temperatures ranging up to 371° C. for thousands of hours. For example, PMR-15 is one of the best known and most widely used PMR polyimide. PMR-15 attributes include relatively easy processing, substantially lower costs, and excellent property retention at elevated temperatures, compared to other commercially available high temperature resin materials.

The preparation of polyimides from mixtures of monomeric diamines and esters of polycarboxylic acids is disclosed, for example, in U.S. Pat. No. 3,745,149. Patentee disclosed that polyimides can be processed from a mixture of monomeric reactants using lower (primary) alcohols to esterify an anhydride endcap and an aromatic dianhydride. These monomeric reactants when combined with an aromatic diamine in the molar ratio of N diester-diacid/N+1 diamine/2 ester-acid endcap, form a monomeric mixture which at high temperature polymerizes to a polyimide. This procedure was the evolution of the terminology PMR (polymerization of monomeric reactants). The initial concept of using lower (primary) alcohols to prepare methyl or ethyl ester-acids remains in use as originally disclosed in the art over the last twenty-five years.

Subsequently, however, few PMR patents have issued that improve over the prior art and generally these patents required a new "wrinkle" such as the use of monofunctional additives or new formulations using new dianhydrides, diamines or endcaps. These prior art patents are still using PMR technology based on methyl or ethyl ester-acids or diesters-diacids formed from lower (primary) alcohols. There is no prior art specifically covering the PMR Extended Shelf Life Technology obtained by the use of higher (secondary) ester-acids and higher (secondary) diester-diacids, as taught by this invention. Until now, all the prior PMR art remains evolved around the use of lower (primary) ester-acids in contrast to the benefits obtained by the use of the higher (secondary) ester-acids in PMR Extended Shelf Life Technology.

The major disadvantages of the state-of-the-art PMR technology, as practiced commercially today, are the limited shelf life of the monomeric solutions at ambient (room) temperatures, the short working outlife time, and an extremely high sensitivity toward premature aging at temperatures even slightly above room temperature. The disadvantages cause premature polymerization during all phases of PMR usage such as in synthesis, manufacturing, shipping, handling, storage, and fabrication layup/processing. The PMR technology employed today still uses the lower (primary) methyl and ethyl diester-diacid and ester-acid of the dianhydride and nadic anhydride endcap respectively. This methyl and ethyl ester technology is PMR's inherent weakness in that imidization proceeds rapidly at about room temperature, thereby quickly aging all PMR types of polyimides such that aged solutions and prepregs expire with limited shelf life within one to three weeks at room temperature thereby being unprocessable with autoclave fabrication techniques. The engineering solution, as opposed to the chemical solution, to premature aging of PMR solutions and prepregs has been through rigorous handling requirements via strict manufacturing temperature control, overnight air shipment in dry ice, freezer storage of received PMR materials and stringent quality control governing allowed outlife usage time and freezer storage time; all of which significantly adds to the final cost of PMR composites.

Another disadvantage of the state-of-the-art PMR technology is the use of toxic lower (primary) methanol and ethanol for esterification and as the solvent for PMR monomer solution preparation and PMR prepreg manufacturing. These primary alcohols create highly toxic volatiles for both the manufacturer and user to control. In comparison, the PMR Extended Shelf Life Technology of this invention only uses the higher (secondary) and much less toxic isopropyl alcohol for the esterification and solvent in the PMR monomer solution preparation and PMR prepreg manufacturing. The evidence of reduced toxicity and increased safety are a lower odor threshold, well before you reach a much higher allowed threshold limit value, an increased autoignition temperature and narrower flammability limits along with less serious medical problems of overexposure in the use of isopropanol, for example, in comparison to the use of methanol or ethanol.

The PMR extended shelf life technology of this invention is based on a chemical solution to significantly retard aging of PMR solutions and PMR prepregs, rather than on an engineering solution of rigid temperature control as evolved and still practiced in present PMR technology. The chemical solution to these problems is the use of the higher (secondary) $C_3$ to $C_5$ alcohols, e.g. isopropyl for esterification of the anhydride endcaps and dianhydride monomers.

SUMMARY OF THE INVENTION

This invention relates to novel compositions of matter and to the process of using higher (secondary) $C_3$ to $C_5$ ester-acids of monoanhydrides and higher (secondary) $C_3$ to $C_5$ diester-diacids of numerous dianhydrides, both formed from $C_3$ to $C_5$ secondary aliphatic alcohols, in preparing the polyimide-forming solution of monomers. One of the preferred compositions and processes relates to the use of the higher (secondary) isopropyl ester-acid of nadic anhydride and the isopropyl diester-diacids of numerous commercially available dianhydrides, e.g. BTDA, 6FDA, PMDA, ODPA, BPDA, etc. Preferably, the isopropyl ester -acids and isopropyl diester -diacids are mixed in solution with $C_3$ to $C_5$ secondary aliphatic alcohols and aromatic polyamines such as the diamines to form PMR monomer solutions, which subsequently form addition cured PMR resins at higher cure temperatures.

The polyimides of this invention are derived from solutions of low-boiling organic solvents and a mixture of polyimide-forming monomers. The solutions of the polyimide-forming monomers are characterized as having an improved or extended shelf-life at ambient (room) temperatures, i.e. stable solutions at temperatures ranging up to about 80° C. and comprise effective amounts of (a) at least one mono-alkyl ester-acid having the formula:

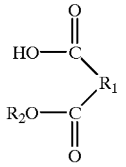

wherein $R_2$ is a lower secondary alkyl radical of 3 to 5 carbon atoms, and $R_1$ is a divalent radical selected from the Group consisting of alkyl, substituted alkyl, aryl and substituted aryl radicals, and (b) at least one diester-diacid or an isomer thereof having a formula selected from the Group consisting of

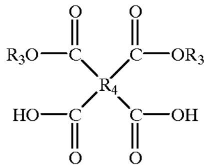

and

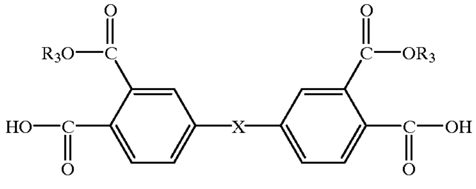

wherein $R_4$ is a tetravalent radical selected from the Group consisting of naphthalene, benzene, and biphenyl radicals, $R_3$ is the same or a different lower secondary alkyl radical of 3 to 5 carbon atoms, and X is a divalent radical selected from the Group consisting of

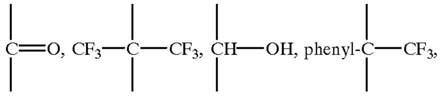

-continued

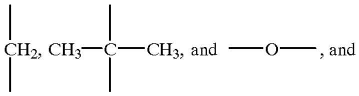

(c) at least one aromatic polyamine selected from the Group consisting of aromatic diamines, aromatic triamines, aromatic tetraamines and mixtures thereof in any proportion.

The organic solutions of polyimide-forming monomers of this invention can be heated to temperatures ranging from about 250° C. to 400° C. to obtain crosslinked polyimide resins having average molecular weights in excess of 10,000. These polyimide resins can be formed into various shapes and sizes in an autoclave or molding equipment e.g. polyimide impregnated carbon fibers for use in high temperature applications.

Accordingly, it is an object of this invention to improve the room temperature storage stability of PMR monomer solutions and PMR prepregs without adversely affecting the processability of PMR polyimide composites.

It is another object of this invention to provide organic solutions of polyimide-forming monomers and a process of preparing said monomeric solutions for use in preparing polyimide resins and polyimide prepregs.

It is still another object of this invention to provide a mixture of polyimide-forming monomers that retards the ambient (room) temperature reactivity of PMR solutions and PMR prepreg materials. This improvement provides a wide safety margin against mishandling of PMR solutions and prepregs by significantly retarding the premature aging and the expiration of the PMR solutions shelf life.

It is a further object of this invention to reduce the solvent toxicity, limit the solvent flammability, provide higher autoignition temperatures, and lower the odor threshold of the polyimide-forming monomeric solutions compared to the state-of-the-art and to improve other health issues by using polyimide-forming monomeric solutions that are less toxic.

These and other objects of this invention will become apparent from a further and more detailed description of the invention as follows.

DESCRIPTION OF THE PREFERRED EMBODIMENTS

The PMR extended shelf life technology of this invention is directed to a composition of matter comprising a polyimide-forming monomeric solution consisting essentially of, for example, at least one aromatic polyamine and a $C_3$ to $C_5$ secondary alkyl ester such as an isopropyl ester of nadic anhydride and at least one dianhydride preferably selected from the Group consisting of 3,3',4,4'-benzophenone tetracarboxylic dianhydride (BTDA); 1,1,1,3,3,3-hexafluoroisopropylidene bisphthalic acid dianhydride (HFDA or 6FDA); 1,2,4,5-pyromellitic dianhydride (PMDA); 3,3',4,4'-oxydiphthalic dianhydride (OPDA) and 3,3',4,4'-biphenyltetracarboxylic dianhydride (BPDA) converted to the corresponding diester-diacid and to the processes for preparing the ester-acid (and other mono ester-acid endcaps) and the diester-diacids of various other aromatic dianhydrides such as BTDA, 6FDA, PMDA, ODPA, and BPDA.

More specifically, the monomeric solutions of the polyimide-forming monomers having an extended shelf life can be illustrated by using the $C_3$ to $C_5$ secondary aliphatic alcohols such as isopropanol, secondary butanol, 2-methyl-3-butanol, 2-pentanol or 3-pentanol; the preferred being isopropanol to form the esters and diesters of this invention as follows:

Mono isopropyl ester-acids

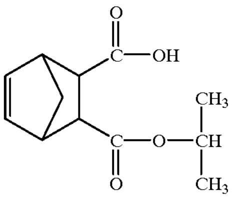

isopropyl nadic ester from

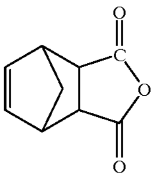

nadic anhydride

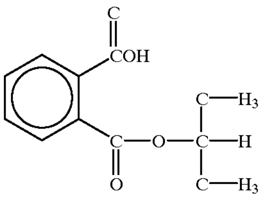

monoisopropyl phthalate from

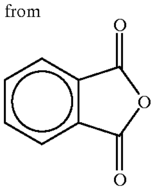

phthalic anhydride

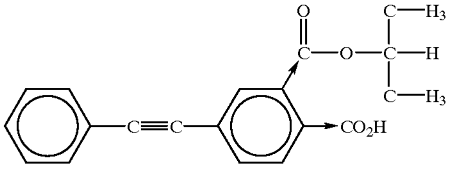

monoisopropylphenylethynyl phthalate from

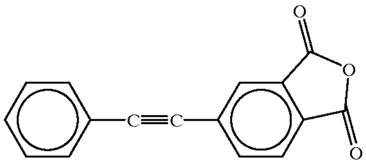

phenylethnylphthalic anhydride

Diisopropyl diester diacids

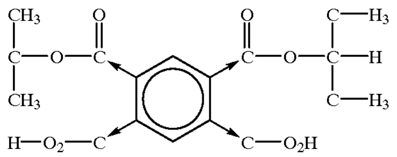

as a 1,3 and 1,4-diester isomer mix from

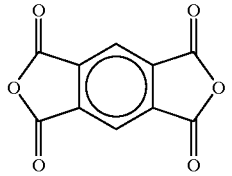

pyromellitic dianhydride

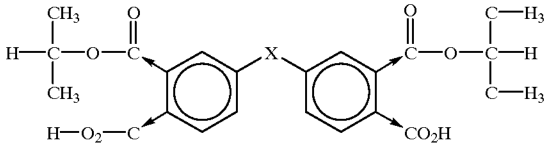

as a 3,3'; 3,4' and 4,4'-diester isomer mix from

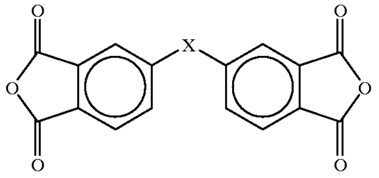

X=C=O(BTDA), $CF_3$—C—$CF_3$(6FDA), O(ODPA) and nil (BPDA)

As a specific example, the mono ester-acids and diester-diacids in combination with at least one aromatic polyamine are mixed in solution with a $C_3$ to $C_5$ secondary aliphatic alcohol as the solvent, e.g. 10% to 80% and preferably 30% to 60% by weight of isopropyl alcohol, and heated to temperatures ranging from about 500° F. to 750° F. to form the cured corresponding polyimides, as illustrated:

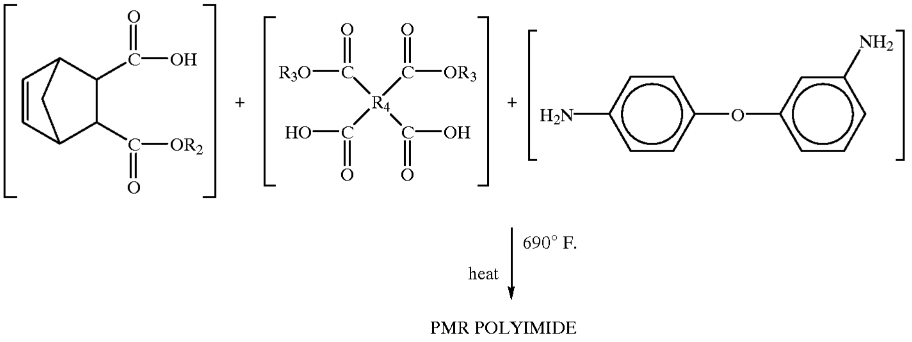

In the above example, the $R_2$ and $R_3$ are either the same or different secondary alkyl radicals derived from $C_3$ to $C_5$ lower secondary aliphatic alcohols, and $R_4$ is a tetravalent aryl radical.

The original PMR (Polymerization of Monomer Reactants) technology was developed in the early 1970's as a means of producing large void free polyimide fiber composites. The principal resin in the PMR family, PMR-15, has been commercially available since the late 1970s and is regarded as the industry standard for aircraft engine applications for long term use at temperatures ranging up to 500° F. The PMR-15 components are currently being used in both military and commercial aircraft engines. More recent adaptations of the PMR approach to high temperature polyimides can be found in such resin systems as PMR-II (a 1977 IR•100Award Winner), AFR-700, TRW-800, and RP-46 (a 1992 R&D 100 Award Winner). Presently, the PMR process uses methyl or ethyl ester-acid monomers. However, work at the NASA Lewis Research Center clearly found that resin solutions and prepregs made with PMR resins have limited shelf life at room temperature. Research at NASA Lewis has determined that this is due to the premature formation of low molecular weight imides. Formation of these aging products adversely affects the handling and autoclave processability of PMR resin solutions and the prepregs. Presently, this aging process can be retarded only by storage of these materials at freezer temperatures. These PMR resin solutions and the prepreg therefrom must also be packed in dry ice and shipped overnight in order to minimize the formation of the aging products. This procedure results in a substantial cost for the handling and shipping of these materials.

However, recent research efforts have led to the development of PMR resins that have an improved shelf life, both as PMR monomer solutions and as PMR prepregs. It was found that this new extended shelf life technology was based upon the use of only aliphatic secondary alcohols having the 3 to 5 carbon atoms such as isopropyl alcohol rather than the methyl or ethyl ester-acids in PMR monomer formulations. Kinetic studies performed at the NASA Lewis Research Center discovered that the rate determining step in the formation of polyimides, as well as the imide-forming solution and prepreg aging products, via the PMR process, is the conversion of the methyl or ethyl ester-acids into anhydrides. The use of the bulkier isopropyl ester-acids, however, significantly retards the rate of anhydride formation which, in turn, limits the formation of undesired solution and prepreg aging products. The secondary isopropyl ester-acids, for example, were also shown to be the only secondary ester-acids that vastly improved the shelf life without unduly further complicating the composite processability. The use of this new chemistry to existing PMR technology increases the room temperature storage life of PMR solutions and prepregs by over an order of magnitude. Thus, the PMR extended shelf life technology eliminates the need for dry ice shipping and freezer storage of PMR materials. The PMR fiber composites prepared with extended shelf life prepregs retain the excellent thermo-oxidative stability and thermo-mechanical strengths equivalent to those made from the current commercially available PMR prepregs.

There are a variety of experimental new and previously developed PMR-type polyimides that compete with each other on the basis of material cost versus desired use temperature such as the nonfluorinated polyimides (DuPont KIII's, PMR-15, RP46) at moderate cost for 500 to 600° F. long term use, to the fluorinated polyimides (PMR-II, VCAP, AFR700, DuPont Avimid N) at high cost for 700° F. shorter term use temperatures, to the difficult-to-process nonfluorinated polyimides (TRW-800) at moderate cost for 800° F. very short term applications. The PMR extended shelf life technology of this invention was not developed to replace or compete with any of these PMR type materials; rather the development was to enhance the utility of all current and future PMR polyimides by allowing a significantly longer shelf life at lower storage and manufacturing temperatures (freezer to hot melt manufacturing temperatures) in order to prevent premature PMR aging during long term storage and manufacturing. Without the PMR extended shelf life technology of this invention, the current state-of-the-art PMR polyimide products will age at least 10× faster over a wide range of storage temperatures (freezer to room temperature) and manufacturing temperatures (hot melt prepreging up to 80° C.)as shown by both formation of soluble aging products (seen by high pressure liquid chromotography) and by formation of precipitates and/or phase separations (highly visible events well past the PMR solution shelf life manufacturers desire).

As more specifically shown in the following Table I, the PMR extended shelflife technology of this invention provides the following benefits: (a) 10–30× increase in room temperature shelf life of PMR solutions making PMR materials more friendly to use, (b) lowers odor threshold to a much safer limit, the opposite of current state-of-the-art methanol based PMR technology, (c) reduced cost and complexity of transporting and storing of PMR materials by allowing room temperature shipping/handling/storage while current state-of-the-art PMR technology requires dry ice shipping and freezer storage, (d) negligible sensitivity to handling/shipping mistakes due to the vastly retarded aging at elevated temperatures and (e) increased applicability for hot melt prepreg manufacturing due to significant reduction in polymerization at hot melt temperatures (up to 80° C. (176° F.) for short times).

TABLE 1

| | Current PMR Technology, Methyl esters with Methanol | PMR Extended Shelf Life Technology, Isopropyl esters with Isopropanol solvent | Magnitude of Improvement, X Fold | |
|---|---|---|---|---|
| Cost, non-fluorinated PMR | | | | |
| e.g., PMR-15, RP-46 fluorinated PMR | Moderate | Moderate | No Change | |
| e.g. PMRII, VCAP, AFR700, Some AVIMID N Room Temperature PMR Solution Stability, Time to a Visible Event* Nonfluorinated PMR, | High | High | No Change | |
| i.e. PMR-15 fluorinated PMR containing p-phenylene diamine and nadic ester endcap | 3 weeks | 100 weeks | >30X | |
| i.e. PMRII, PMRII-50, AFR-700 | 2–7 days | >60 days | 10X Minimum to >30X | |
| Some newer Developmental non-Toxic PMR-BAX formulations | >3 days | 42 days | >14X | |
| After 2 hr. @ 80° C. (176° F.), PMR solution and prepreg stability PMR-15 | methanol solution | isopropanol solution | isopropanol prepreg** | |
| Diamine consumed | 45% | 3% | 5% | 9–15X |
| Diester-diacid consumed | 25% | 2% | 3–4% | 8–12X |
| endcap & diamine aging product formed | 89% | 7% | 17% | 5–13X |
| Prepreg handling characteristics, manufacturing | excellent | excellent | No Change | |
| transportation | dry ice required | room temperature allowed | lower shipping costs | |
| outlife | dries overnight | months to dry | >30X | |
| drape | fine (unless dry) | fine | No Change | |
| tack | fine (unless dry) | excessive (unless dried) | Excessive | |
| Solvent toxicity and safety TLV (time weighted avg.) | methanol 200 ppm | isopropanol 400 ppm | 2X | |
| odor threshold | 5900 ppm | 40 ppm | >148X | |

TABLE 1-continued

| | Current PMR Technology, Methyl esters with Methanol | PMR Extended Shelf Life Technology, Isopropyl esters with Isopropanol solvent | Magnitude of Improvement, X Fold |
|---|---|---|---|
| odor threshold-TLV | 29.5 (unsafe) | 0.1 (10X safety margin) | 295X, much safer |
| autoignition temp. | 385° C. | 399° C. | 14° C. |
| Flammability limits, (lower to upper,%) | 6.7 to 36% | 2.2 to 12% | narrower, but lower |
| vapor pressure | 97 mm | 33 mm | 3X, less |
| boiling point | 65° C. | 82° C. | 17° C., evaporation |

*Time to a visible event = precipitation or phase separation. Not all PMR's do this as their aging products may only be seen by high pressure liquid chromatography because the aging products are still soluble or kept in solution by adding other solvents (which complicates composite processability)

**PMR solutions age faster than PMR prepregs at room temperature due to increased mobility, but at elevated temperature prepreg ages faster as increased mobility and higher monomer concentration increases aging rate.

The PMR extended shelf life technology of this invention is founded on the use of $C_3$–$C_5$ secondary alcohols in preparing the ester-acids and the use of $C_3$–$C_5$ secondary alcohol solvents which is an improvement over state-of-the-art methyl ester-acids and methanol solvent. Specifically, the improved shelf life reduces or eliminates the need for low temperature transportation and storage while providing a safer prepreg that is still well below the safety allowed Threshold Limit Value (TLV) when the isopropanol is smelled at its odor threshold. The opposite is the situation for the current use of the methanol or ethanol based PMR technology.

The lack of aging for extended storage life PMR materials also means that variation in the batch-to-batch manufacturing of PMR resins can be significantly lessened which would provide benefits in consistent processability (the material is identical each time before processing) resulting in reduced scrap rates in comparison to the current PMR technology. The current PMR technology low scrap rate and consistent processability are attained by the composites industry only by use of low temperature shipping, handling, and storage specifications during manufacture and processing of PMR prepregs. These specifications include rigid quality control via high pressure liquid chromatography for the formation of the premature imide aging products which the new PMR extended shelf life technology retards from forming.

The application of the extended shelf life technology of this invention applies to all of the non-toxic and current PMR polyimide monomeric solutions and prepregs, because this technology is general to retarding the rate determining step (anhydride formation) in the low temperature aging of all PMR materials. The extended shelf life technology can be used for all types of polyimides formed via the PMR process that has been developed over the past quarter of a century for aerospace and aeronautical PMR resin and PMR composite applications such as currently in jet engine, missile and other high temperature composite applications. This technology does not expand on the applications, rather it enhances the PMR material available for these applications.

Some applications not currently optimized or available with PMR technology are applications requiring longer shelf life or higher manufacturing temperatures such as stable PMR material repair kits with long term expiration dates now possible and hot melt PMR prepregs that now would not age during the hot melt manufacturing process (done typically for short finite times up to 80° C. (176° F.). Both of these applications now are more feasible due to the proven long term shelf life at storage times and temperatures for which the current methyl or ethyl ester PMR technology does not meet the requirements. Additionally, the general nature of the extended shelf life technology of this invention also makes it applicable to the newer PMR resins now under development.

The following are some specific examples of tetracarboxylic acid dianhydrides suitable for practicing this invention including 2,3,3',4'-benzophenonetetracarboxylic acid dianhydride
3,3',4,4'- benzophenonetetracarboxylic acid dianhydride
2,2',b 3,3'- benzophenonetetracarboxylic acid dianhydride
2,3,3',4'- biphenyltetracarboxylic acid dianhydride
3,3',4,4'- biphenyltetracarboxylic acid dianhydride
2,2',3,3'- biphenyltetracarboxylic acid dianhydride
4,4'- isopropylidenediphthalic anhydride
3,3'- isopropylidenediphthalic anhydride
4,4'- oxydiphthalic anhydride
4,4'- sulfonyldiphthalic anhydride
3,3'- oxydiphthalic anhydride
4,4'- methylenediphthalic anhydride
4,4'- thiodiphthalic anhydride
4,4'- ethylidenediphthalic anhydride
hexafloroisopropylidene bisphthalic anhydride (6FDA),
phenyltrifluoroethylidene bisphthalic anhydride (3FDA),
2,3,6,7- naphthalenetetracarboxylic acid dianhydride
1,2,5,6- naphthalenetetracarboxylic acid dianhydride
benzene-1,2,3,4,- tetracarboxylic acid dianhydride
benzene-1,2,4,5-tetracarboxylic acid dianhydride
pryazine-2,3,5,6- tetracarboxylic acid dianhydride
thiophene-2,3,4,5- tetracarboxylic acid dianhydride, and the indicated esters thereof.

These anhydrides and esters thereof and methods for their preparation are disclosed in U.S. Pat. No. 3,745,149 and U.S. Pat. No. 3,856,752, the disclosures of which are incorporated herein by reference.

In preparing the polyimide-forming solutions of this invention, various polyfunctional aromatic amines, including the diamines, triamines and tetraamines and mixtures thereof are used with the alkyl ester-acids and diester-diacids. The preferred polyfunctional amines include the diamines, e.g. aromatic diamines containing at least one benzene ring and preferably two benzene rings including:

para-phenylenediamine
meta-phenylenediamine
4,4'- diamino-diphenylpropane
4,4'- diamino-diphenylmethane
4,4'- benzidine
4,4'- diamino-diphenyl sulfide
4,4'- diamino-diphenyl sulfone
3,3'- diamino-diphenyl sulfone
1,5- diamino-naphthalene
bisaniline-m-xylidene (BAX)
bisaniline-p-xylidene (BAX)
bisaniline-p-benzyl carbonyl (COBAX)
3,3'- diaminobenzophenone
4,4'- diaminobenzophenone
3,3'- diaminodiphenylether
3,4'- diaminodiphenylether
4,4'- diaminodiphenylether
4,4'- diaminodiphenylmethane
3,3'- dimethoxy benzidine
2,2'- dimethylbenzidine
3,3'- dimethyl benzidine and triamines such as
1,3,5- triaminobenzene
2,4,6- triamino-s-triazine
4,4',4"- triaminotriphenylmethane
4,4',4"- triaminotriphenylcarbinol Monoamine endcaps used to replace the alkyl acid-ester endcaps include, for example, mono amines such as 3- or 4-amninophenyl acetylene (APA), 3 or 4-penylethynylaniline (PEA) and 3 or 4- aminostyrene (PAS) having the formulae:

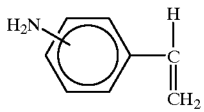

3 or 4-PAS

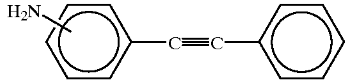

3 or 4-PEA

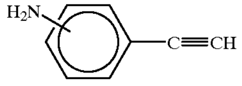

3 or 4-APA

This embodiment of the invention reverses the molar ratio, N diester-diacid, N+1 polyamine and 2 alkyl ester acid endcap to molar ratio N polyamine, N+1 diester-diacid and 2 monoamine endcaps.

This embodiment uses an endcap that contains an amine group rather than an anhydride group to be esterified, thereby eliminating the use of the isopropyl ester of nadic anhydride. Here the embodiment is to use the reverse ratio as N moles aromatic diamines, N+1 moles isopropyl diester-diacids of the dianhydride monomer and from about 0.8 to 2.2 moles of the monoamine endcap, but 2 moles is generally preferred as a monofunctional crosslinkable primary aromatic amine.

Another embodiment of this invention is the use of an unreactive non-crosslinkable endcap, such as aniline or isopropyl ester of phthalic anhydride, or slight excess of isopropyl diester-diacid of the dianhydride to control at N>20 for the preparation of high molecular weight linear condensation polyimides. Another embodiment is the use of less than 2 moles (e.g. only one) of isopropyl nadic ester as endcaps, leaving the excess diamine as the other endcap. An example of this is AFR700. It consists of one mole of isopropyl nadic ester, N moles of isopropyl diester-diacid of 6FDA, and N+1 moles of p-phenylenediamine; the +1 mole serving as the second endcap. For purposes of this invention, some of the preferred aromatic diamines include the $C_6$–$C_{20}$ arylene diamines such as p-phenylenediamine, m-phenylenediamine and bis(p-aminophenyl) methane, bis aniline-p-xylidene (BAX) and the like.

The following examples illustrate the polyimide-forming solution of monomers which have an improved or extended shelf life.

EXAMPLE 1

Preparation of isopropyl ester-acid of nadic anhydride

| Nadic anhydride | Heat time | Heat Temp. Reached | Yields Isopropyl ester-diacid of Nadic Anhydride | Melting Points |
|---|---|---|---|---|
| 20 g | 78 hrs. | — | 80.9% | 88–89 ½° C. |
| 100 g | 49 hrs. | — | 86.9 | 87–89° C. |
| 853 gms | 48 hrs. | 89° C. | 100% | 76–89° C. |
| 685 gms | 48 hrs. | 89° C. | 92.2% | 80–85° C. |
| 886 gms | 24 hrs. | 89° C. | 97.6% | 72–88 ½° C. |

In the reaction, the temperature reached 89° C. even though isopropanol boils at 82° C. As the alcohol is consumed the solids content increases and the boiling point elevates from 82 initially to read 89° C. by reaction end. The nadic anhydride all dissolves quickly but takes extended time to react. The reaction takes a minimum of 12 hours after dissolution to reach completion, 24 hours is safer, hence a time range of 12–24 hours is suggested.

Combined 886.2 g. Nadic anhydride (m.p. 161–162° C.) with ≈996 g iPrOH (ACS reagent grade, b.p. 82.1° C.–82.4° C.) in a 2 liter round-bottom flask with a stir bar. Refluxed at 89° C. for 24 hours. A HPLC of the solution at 24 hours showed that the reaction was complete, allow to cool to room temperature and reaction solidified. Heated flask to dissolve product. Evaporated as much isopropanol off as possible on the evaporator. Solution resolidified on the evaporator. Used heptane to get the crystals from the flask to a 4 liter beaker. Washed crystals with hexane, filtered, and placed in two recrystallization dishes. Placed both dishes in a warm oven to dry. Recrystallized entire product from hexane (~100 g./800 ml). Filtered those solutions which were cloudy through a Mr. Coffee filter. Collect additional product by partial evaporation, cool and filter. Continued to isolate remaining product from wash hexane repeated evaporation, cooling, filtering and washing. Placed all recrystallization crops in the oven to dry. Filtered remaining product and placed in a warm oven to dry. HPLC of one of the crops (#1) showed about 1.2% diacid.

Weights, m.p. and LC results of all dishes:

| Crops | Product Weight | Melting Point | Analysis |
|---|---|---|---|
| #1 | 415.75 g | m.p. 86–88° C. | 1.20% diacid |
| #2 | 474.38 g | m.p. 86–88° C. | 1.42% diacid |
| #3 | 208.71 g | m.p. 87.5–88.5° C. | 2.08% diacid |

-continued

| Crops | Product Weight | Melting Point | Analysis |
|---|---|---|---|
| #4 | 58.43 g | m.p. 82–86° C. | 5.13% diacid |
| #5 | 11.79 g | m.p. 80–86° C. | 4.88% diacid |
| #6 | 12.53 g | m.p. 72–78° C. | 6.68% diacid |
| total = | 1181.59 g | | |

Theoretical Yield = 5.3983 mol (224.259 g/mol) = 1210.617 g

% Recrystallized Yield = 1181.591181.59g/1210.617gg X 100% = 97.602%

EXAMPLE 2

Preparation of isopropyl diester-diacids of BTDA

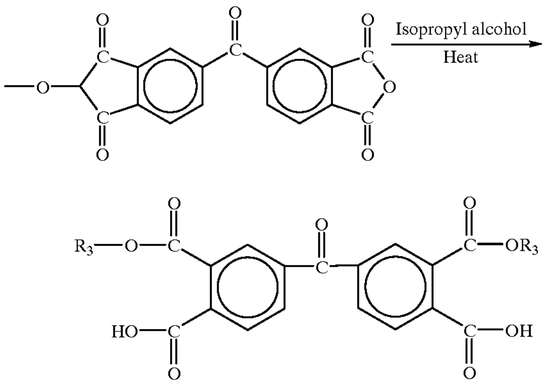

wherein $R_3$ is derived from isopropyl alcohol.

Dry the BTDA overnight in a vacuum oven at least at 120° C., to insure it is not hydrolyzed by moisture in the air. In a 250 ml. round bottom flask with a magnetic stir bar, heat to reflux temperature a mixture of 26.85 gms (0.083 moles) of 3,3',4,4'-benzophenone tetracarboxylic dianhydride (BTDA) and 46.89 gms of isopropanol (an amount calculated to arrive at 36.87 gms of isopropanol and 36.87 gms isopropyl diester-diacid of BTDA at reactions completion. The dissolution of the BTDA takes 6 to 12 hours in the refluxing isopropanol. Continue heating for no more than 2 additional hours (on large reactions shut the heat off when dissolution occurs as the reaction will continue as the large reaction cools over up to 1 hours). The isopropyl diester-diacid BTDA solution is used in situ in further PMR formulation; adding an appropriate diamine(s) and endcap(s) in an appropriate molar ratio (N/N+1 diamine/2 end caps).

EXAMPLE 3

Preparation of isopropyl diester-diacid of hexafluoroisopropylidine bisphthalic acid dianhydride (6FDA) Dry the 6F overnight in a vacuum oven at least at 120° C. to insure any diacids are converted back to anhydrides before proceeding. As in example 3, esterify 47.48 gms (0.107 mole) of 6FDA (previously dried) in 73.18 gms of isopropanol at reflux temperature; the amounts being calculated to prepare 60.33 gms isopropyl diester-diacid of 6FDA in 60.33 gm of isopropanol=a 50 weight percent solution. The dissolution of 6FDA takes 2 to 4 hours in refluxing isopropanol (whereas in methanol the same reaction takes only 1 hour or less). Continue heating for no more than 2 hours after dissolution occurs, as before, to prevent forming tri and tetra esters during prolonged esterifications. The isopropyl diester-diacid 6FDA solution is also used in situ in further PMR formulations by adding appropriate diamine(s) and endcap(s) in an appropriate molar ratio N/(N+1) diamine/2 isopropyl ester-acid of nadic anhydride.

EXAMPLE 4

Simultaneous preparation of in situ ester mixtures of BTDA and NA in a molar ratio for N BTDA/N+1 diamine/2 isopropyl nadic ester end cap where N=2 for 3 diamine to be added later. Use previously dried BTDA and NA. Combine 4.92 gm (0.03 mole) of NA, 9.67 gm (0.03 mole) BTDA in 25.41 gm isopropanol to achieve 50% solids when reacted, heat to reflux temperature and solution occurs 2–4 hours (instead of 6 hrs. for BTDA and 1 hour for NA individually). HPLC shows both are esterified in 5 hours in refluxing isopropanol, instead of 6–12 hours for BTDA and 12–24 hours for NA individually. Increasing the solids content to 75% (again 4.92 gms NA, 9.67 gm BTDA but only 12.07 gm isopropanol) results in a faster dissolution time of 1 hour at 75% solids (instead of 2–4 hours at 50% solids) but the same dissolution time as BTDA or NA done individually at 75% solids. However, the important point is complete coesterification at 75% solids was in less than 3 hours versus 5 hours when coesterified at 50% solids in refluxing isopropanol.

EXAMPLE 5

Simultaneous preparation of in situ ester mixtures of 6FDA and NA in a molar ratio of N 6FDA/N+1 diamine/2 isopropyl nadic ester where N=9 (for 10 diamine is to be added later). Again start with previously dried 6FDA and NA. Combine 19.99 gm (0.045 mole) 6FDA and 1.64 gm (0.01 mole) of NA in 33.65 gm isopropanol to achieve 50% solids when reacted, heat to reflux temperature and solution occurs in 3 hours (instead of 2–4 hours for 6FDA or 1 hour for NA individually). HPLC shows both are also esterfied in 5 hours in refluxing isopropanol, instead of 2–4 hours for 6FDA and 12–24 hours for NA individually. Increasing the solids content to 75% (9.99 gm, 0.0225 mole, 6FDA, 0.8202 gm, 0.005 mole NA and 7.6119 gm isopropanol) results in an almost identical dissolution time 2½ hours vs. 3 hours, both individually or combined (except NA alone at 75%=1 hours dissolved). However the important point is complete coesterification (shown by HPLC) at 75% solids was in 3½ hours vs. 5 hours for coesterification at 50% solids. In a similar fashion other dianhydrides and nadic anhydride (or other anhydride endcaps) can be in situ coesterified to isopropyl esters, but each needs to be individually carefully studied by the user as esterification times will vary depending on temperature, traces of water, reaction size, upheat rates and solids content.

PREPARATION OF POLYIMIDE PREPREGS

The following are the standard methods of preparing isopropanol based PMR-15 at N=2.08 iPrBTDE/3.08 MDA and 2 iPrNe as in calculations, the PMR monomer solution of which was coated by hand into unidirectional Celoon 6000 graphite fiber wound on a drum. Alternatively, the PMR monomer solution can be coated on woven graphite (or glass) cloth instead of on unidirectional drum wound. The calculations are the same. How much resin is needed to produce a composite of X % fiber with 100-X % resin? In this case 61% fiber and 39% resin. The range can go from about 50 to 80% fiber (50 to 20% resin). The curing is via autoclave or compression molding at a final temperature of 600° F., final pressure is no more than 200 psi for autoclave but compression is done at 500 to 2000 psi in a matched metal mold. Both procedures can use what is called unidirectional prepreg tape (all fiber in one direction) or cloth woven material with fiber in 2 directions. For PMR II-50 and VCAP75 examples, all the same calculation methodology applies but final cure temperature is 700° F.

Calculation of iPr BTDE/MDA/iPrNE PREPREG DATA 12 turns/inch×12 inches×0.4747 g/turn=68.3568 g fiber on drum.

68.35 g. fiber/61%=X/39% =gms resin desired.

$$x = \frac{\begin{array}{c}43.703\text{ g}\\ +1.3\text{ g}\end{array}}{45.0\text{ g}}\ \text{molding powder}\ \frac{45.0\text{g}}{1500\text{ g/mole}}$$

$$= 0.03\text{ mol to prepare.}$$

| Monomer | | Moles | Molar ratio | Mole Wt. | | |
|---|---|---|---|---|---|---|
| iPrBTDE | = | (.03) | (2.0836) | (442.426) | = | 27.655 g |
| MDA | = | (.03) | (3.0836) | (198.270) | = | 18.342 g iPrOH to maintain 50% solids = 31.797 |
| iPrNE | = | (.03) | (2) | (224.259) | = | 13.445 g |
| Prepare iPrBTDE as per example 3 using | | | | | | |
| BTDA | = | (.03) | (2.0836) | (322.233) | = | 20.142 g |
| iPrOH | = | | 2X(27.655 | −20.142 | = | 35.168 g |
| to create 27.65 g iPrBTDE in 27.655 gm iPrOH | | | | | | |
| | Add wt. of MDA | | | 18.342 g | | |
| | Add wt. of iPrNE | | | 13.455 g | | |
| | Add iPrOH to maintain 50% solids = 31.797 gms. | | | | | |

Remove twice the weight of desired molding powder (2.6 g). Use remaining 50% solids PMR solution to prepare PMR prepreg.

Combined BTDA (20.142 g), and iPrOH (35.168 g) in a 200 ml round bottom flask with stir bar. Heated at reflux until dissolved (5½ hr) then for one hour to ensure complete reaction as in Example 2. Removed from heat and added 18.342 g MDA, 13.445 g iPrNE. After the mono and diester acids and diamine are combined, solvent(s) are added to maintain 50% solids which can include other alcohols, even primary alcohols such as methanol or ethanol, and non-alcoholic solvents as long as these solvents are low boiling, e.g. bp. below 100° C. In this example, 37.797 gms isopropanol is added as the preferred solvent to maintain 50% solids. Dissolved with stirring and weighed the flask to determine the solution weight and removed 2.6 g for molding powder. Brush coat PMR solution evenly unto 12" of drum wound graphite fibers, rinsing the flask with iPrOH. Prepreg was allowed to dry overnight and taken off the drum and cut into 3"×8" pieces. Molding powder solution was heated until it formed a gummy residue. It was then placed in an oven at 400° C. for 1 hour to remove all volatiles. Laminate was made from prepreg by way of compression (example 6) or autoclave molding techniques (examples 7–8).

EXAMPLE 6

Assemble 12 3×8 inch plies into a stack and preheat them in a tray with glass 3×8 inch glass cloth top and bottom to 400° F. for 1 hour to imidize and remove solvents. Place ply stack in a 3×8 inch matched metal die, heat to 450° F., apply 1000 psi and continue to 600° F. Keep at 600° F. 2 hours in press, cool, remove finished laminate.

STANDARD COMPRESSION MOLDING CYCLE iPr/iPr PMR-15 in 100% iPrOH sample calculations needed to determine resin flow (bleed) during compression processing using prepregs stored six months at room temperature. Before staging:

wt. of laminate and bottom porous = 60.21 g    wt. of laminate = 59.11 g.

top − porous = 1.09 g    bottom − porous = 1.10 g
2 glass = 8.60 g    2 glass = 8.42 g.
Total 9.69 g    9.52 g After staging:

Laminate weight = 48.28

Top = 10.17 g − 9.69 = 0.48 g    bottom = 10.69 g − 9.52 g = 1.17

Volatiles = 59.11 − (48.28 + 0.48 + 1.17) = 9.18 g

% volatiles = 15.53%    % resin flow = 3.42%

After Processing at 600° F./2 hr.:

Laminate weight = 47.68 g

Wt. of bleed = 0.2715 g $$\% \text{ resin flow} = \frac{.2715}{48.28} \times 100\% = .5623\%$$

$$\% \text{ Volatiles} = \frac{48.28 - (47.68 + .2715)}{48.28} \times 100\% = .68\%$$

Postcured Weight = 47.54 g.

Preparation for Autoclave Heat Pressing

Freecoat 3"×8" plates and frame—let dry. Place 8½"×8½" nonporous (Teflon) over bottom of large frame. Cut 3"×8" sheets of: 4 glass cloth, 1 nonporous, 2 porous. Weigh these 3"×8" pieces separately except glass cloth weigh 2 at a time. Keep pieces for top and bottom of laminate separate. Place 3"×8" frame coated side down then layers in this order: 2 glass, 1 porous and 12 plies (weigh these together), 1 porous, 2 glass, 1 nonporous. Put plate on top coated side down. Put two glass cloths 8½"×8½" on top of plate. Place high temperature adhesive around edge of large frame. Place Kapton film on top. Cut the excess Kapton away from frame. Place top part of frame on and place clamps on 3 to a side. Place thermocouple in hole on side of frame. Place frame in press. Attach vacuum tube and plug in thermocouple. Pull a vacuum on the frame. Set stops on a piece of glass cloth on frame. Lower the press.

Autoclaving—Heat Press

Get temperature up to ~125° F., rate of 5° F./min., at 15 mmHg and then hold at that temperature for 30 minutes (by shutting off temperature control). Turn temperature control on again (set at 250° F.). Record the temperature at 3 minute intervals (trying to keep rate at 5° F./min.). As the temperature nears 250° F. begin to move the control up in 20–30° F. increments. At 300° F., close the valve on the water vacuum to increase vacuum to ~72 mmHg. Heat to 400° F. and hold for 1 hour. After 1 hour set the pressure to 0, hit the open button, remove the stops and place a 3 inch×8 inch metal plate on the prepreg. Close. Set temperature at ~460° F. When the temperature reaches ~450° F., apply 270 psi pressure. Increase the temperature by 50° F. increments until 600° F. Hold at 600° F. for 2 hours. After 2 hours, shut off heat and vacuum pump. Let cool down. Remove laminate and weigh.

PMR II-50 monomer solution and prepreg preparation.

To prepare about 225 gms resin for 375 gm.

$$\text{Graphite cloth at N + 9 PMR II − 50 wt.} \frac{225}{5046} = 0.04458 \text{ mole.}$$

| Monomer | Moles | Molar Ratio | | Mole Weights |
|---|---|---|---|---|
| iPr6FDE | =(.04458 mole) | (9)(mole wt.) | = | 203.833 gm |
| PPDA | =(.04458 mole) | (10)(mole wt.) | = | 48.194 gm |
| iPrNE | =(.00458 mole) | (2)(mole wt.) | = | 19.998 gm |

6FDA=(9) (0.04458) (444.246)=178.179 gm in 274 gm isopropanol—dissolved in 5 hours—heat 1 hour more and cool as in example 3. Add 48.194gm PPDA and 19.988 gm iPrNE. Slightly warm to dissolve and when in solution coat via a paint brush a T650-35 graphite cloth (30½ inch×52 inch). Let air dry and cut into 84 - 4×4 inch plies, using the edge scraps for characterization via Rheology, DSC, TGA, TMA, etc. The prepregs can be stored at room temperature up to 4 years and can be still autoclave processed satisfactorily.

The final process temperature time is about 700° F./1 hr. compared to PMR-15 at 600° F./2 hr.

PMR II-50 IN AUTOCLAVE MOLDING iPr/iPr PMRII-50 IN 100% iPrOH calculations needed to determine resin flow (bleed) during autoclave processing using prepreg stored twelve months at room temperature.

Before staging:

wt. of laminate & bottom porous = 57.18 g    wt. of laminate = 56.11 g top − porous = 1.07 g  total 11.80g    bottom − porous = 1.07 g  total 11.84g
2 glass = 8.74    2 glass = 8.78 g
nonporous = 1.99 g    nonporous = 1.99 g After Autoclave Processing:

| | | | | | Flow into bleeder |
|---|---|---|---|---|---|
| Top | = | 12.59 g | – | 11.80 = | 0.79 |
| Bottom | = | 12.14 g | – | 11.84 = | 0.30 |
| Nonporous - still 1.99 g | | | | | 1.09 total flow |

Laminate weight=47.60 g
Wt. of bleed=1.09 g
% resin flow=2.29%
weight loss=8.51 g
% weight loss=15.167 g

VCAP-75 MONOMER SOLUTION AND PREPRREG PREPARATION

The isopropyl nadic ester (iPrNE) was changed for a different endcap, 4-aminostyrene. This changes molar ratio from N/N+1/ 2 for PMR II-50 to N+1/N/2 where N=14 for VCAP-75 (due to endcap is an amine instead of ester-acid). For same size graphite cloth as for PMRII-50, 225 gm resin for 375 gm cloth.

225/7874 (VCAP mole wt)=0.02858 moles resin desired iPr6FDE=(0.02858) (N+1=10) (mole wt.=564.440)=241.8317 gm PPDA=(0.02858) (N=9) (mole wt.=108.14)=43.2948 gm 4 amino styrene=(0.02858) (2) (mole wt.)=6.807 gm Esterify (10) (444.246) (0.02858)=190.335 gm of 6FDA in 293 gm isopropanol. (Use 6FDA after previously drying 24 hours at 130° C. in vacuum). The solution is 241 gm iPr6FDE in 241 gm isopropanol. Cool. Add 43.29 gin PPDA and 6.807 gm aminostyrene. Brush by hand the solution unto a 30½ inches×52 inches piece of T650-35 graphite cloth and air dry overnight at room temperature. Cut into 4×4 inches plys which are used to compression and autoclave process laminate after up to 50 months of room temperature storage using similar 700° F. cycles as for PMR II-50.

As disclosed herein, the PMR extended shelf life technology of this invention under scores the importance of PMR resins to the aerospace industry and the far-reaching benefits of this extended shelf life technology to current and future PMR systems. This invention represents a significant advancement in simplifying the manufacturing, shipping, handling, storage, and fabrication of all types of PMR polyimide solutions and prepregs, rather than for only a specific PMR material, by providing reduced aging, lower shipping/storage costs, improved solvent safety, and consistent processability while eliminating batch-to-batch variability. A greater than an order of magnitude improvement in shelf life without adversely affecting subsequent composite processability is a major accomplishment that vastly improves on the state-of the-art PMR technology as first discovered over 25 years ago and yet to be improved upon until now with the introduction of this new PMR extended shelf life technology. Its application as a general solution to the premature shelf life aging of all PMR materials insures that the PMR extended shelf life technology will be continually applied to future PMR resins under development including the environmentally friendly, non-toxic PMR-15 replacement resin the aerospace industry is currently desperately searching for.

While this invention has been described by a number of specific examples it is obvious that there are other variation and modification that can be made without departing form the spirit and scope of the invention as set forth in the appended claims.

The invention claimed:

1. A stable monomeric solution of low-boiling organic solvents and a mixture of polyimide-forming monomers having an extended shelf-life at temperatures ranging up to about 80° C. consisting essentially of:

(a) at least one mono-alkyl ester-acid having the formula:

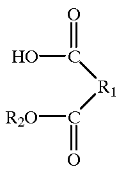

wherein $R_2$ is a lower secondary alkyl radical of 3 to 5 carbon atoms, and $R_1$ is a divalent radical selected from the Group consisting of alkyl, substituted alkyl, aryl and substituted aryl radicals, and (b) at least one diester-diacid and isomers thereof having the formula selected from the Group consisting of:

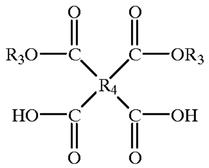

and

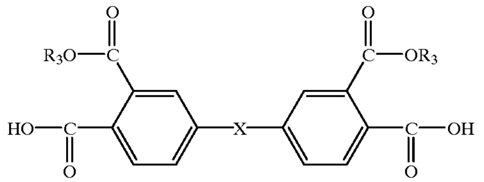

wherein $R_4$ is a tetravalent aryl radical selected from the Group consisting of naphthalene, benzene and biphenyl radicals, $R_3$ is a lower secondary alkyl radical of 3 to 5 carbon atoms, and X is a radical selected from the Group consisting of C═O, $CF_3$—C—$CF_3$, CHOH, phenyl-C—$CF_3$, $CH_2$, $CH_3$—C—$CH_3$, and —O—, and (c) at least one aromatic polyamine selected from the Group consisting of aromatic diamines, aromatic triamines, aromatic tetraamines and mixture thereof.

2. The stable monomeric solution of claim 1 wherein the mixture of polyimide-forming monomers consist essentially of about N moles of the diester-diacid, N+1 moles of the aromatic diamine and about 0.8 to 2.2 moles of the alkyl ester-acid wherein the value of N ranges from about 2 to 30.

3. The stable monomeric solution of claim 2 wherein the organic solvent is a lower molecular weight aliphatic secondary alcohol having 3 to 5 alkyl carbon atoms.

4. The stable monomeric solution of claim 2 wherein $R_2$ and $R_3$ are derived from either the same or different alkyl secondary alcohols having 3 to 5 alkyl carbon atoms.

5. The stable monomeric solution of claim 2 wherein $R_2$ and $R_3$ are derived from either the same or different alkyl secondary alcohols selected from the Group consisting of isopropyl, secondary butyl, 2-methyl-3-butyl, 2-pentyl and 3-pentyl alcohols.

6. The stable monomeric solution of claim 5 wherein the secondary alcohol is isopropyl alcohol.

7. The stable monomeric solution of claim 1 wherein the mixture of polyimide-forming monomers consist essentially of about N moles of the aromatic polyamines, N+1 moles of the diester-diacids and the alkyl ester endcap is replaced by 0.8 to 2.2 moles of at least one of monoamine endcap wherein the value of N ranges from about 2 to 30.

8. The stable monomeric solution of claim 1 wherein $R_2$ and $R_3$ are either the same or different radicals derived from secondary aliphatic alcohols having3 to 5 carbon atoms.

9. The stable monomeric solution of claim 1 wherein $R_1$ is a divalent radical derived from nadic anhydride.

10. The stable monomeric solution of claim 2 wherein $R_4$ is a tetravalent benzene radical.

11. The stable monomeric solution of claim 2 wherein $R_4$ is a tetravalent biphenyl radical.

12. The stable monomeric solution of claim 2 wherein $R_1$ is a divalent radical derived from nadic anhydride and $R_4$ is a tetravalent radical derived from pyromellitic dianhydride.

13. The stable-monomeric solution of claim 2 wherein $R_1$ is a divalent radical derived from nadic anhydride and X is a carbonyl group derived from benzophenone tetracarboxylic dianhydride.

14. The stable monomers solution of claim 2 wherein $R_1$ is a divalent radical derived from nadic anhydride and X is a hexafluoroisopropylidene group derived from hexafluoroisopropylidene bisphthalic dianhydride.

15. A process of preparing polyimides which comprises heating a monomeric solution of at least one low boiling organic solvent comprising a mixture of polyimide-forming monomers; said solution of polyimide-forming monomers having an extended shelf life at temperatures ranging up to about 80° C. which consist essentially of:

(a) mono-alkyl ester-acid having the formula:

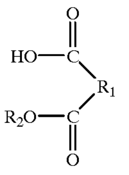

wherein $R_2$ is a lower secondary alkyl radical of 3 to 5 carbon atoms, and $R_1$ is a divalent radical selected from the Group consisting of alkyl, substituted alkyl, aryl and substituted aryl radicals, and (b) at least one diester-diacid and isomers thereof having the formula selected from the Group consisting of:

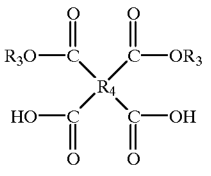

and

-continued

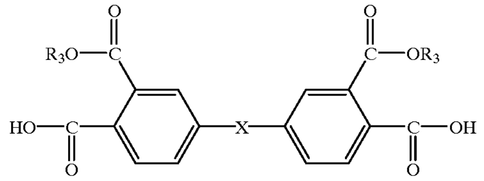

and, wherein $R_4$ is a tetravalent aryl radical selected from the Group consisting of naphthalene, benzene, and biphenyl radicals, $R_3$ is a secondary alkyl radical having 3 to 5 carbon atoms, and X is a radical selected from the Group consisting of C═O, $CF_3$—C—$CF_3$, CHOH, phenyl-C—$CF_3$, $CH_2$, $CH_3$—C—$CH_3$, and —O—, and (c) at least one aromatic polyamine selected from the Group consisting of aromatic diamines, aromatic triamines, aromatic tetraamines and mixtures thereof.

16. The process of claim 15 wherein the monomeric solution of polyimide-forming monomers is heated to temperatures ranging from about 250° C. to 385° C.

17. The process of claim 15 wherein the mixture of polyimide-forming monomers consist essentially of about N moles of the diester-diacid, N+1 moles of the aromatic polyamine 0.8 to 2.2 moles of the alkyl ester-acid wherein the value of N ranges from about 2 to 30.

18. The process of claim 15 wherein the mixture of polyimide-forming monomers is a solution consisting essentially of about N moles of the aromatic polyamines, N+1 moles of the diester-diacids and the alkyl ester endcap is replaced by 0.8 to 2.2 moles of a monoamine endcap wherein the value of N ranges from about 2 to 30.

19. The process of claim 15 wherein at least one of the organic solvents is a lower molecular weight aliphatic secondary alcohol having 3 to 5 alkyl carbon atoms.

20. The process of claim 15 wherein $R_2$ and $R_3$ are derived from either the same or different alkyl secondary alcohols having 3 to 5 alkyl carbon atoms.

21. The process of claim 15 wherein $R_2$ and $R_3$ are derived from either the same or different alkyl secondary alcohols selected from the Group consisting of isopropyl, secondary butyl, 2-methyl-3-butyl, 2-pentyl and 3-pentyl alcohols.

22. The process of claim 15 wherein $R_1$ is derived from nadic anhydride.

23. The process of claim 21 wherein $R_2$ and $R_3$ are the same radicals derived from lower secondary aliphatic alcohols of 3 to 5 carbon atoms.

24. The process of claim 21 wherein the secondary alcohol is isopropyl alcohol.

25. The process of claim 15 wherein $R_4$ is a benzene radical.

26. The process of claim 15 wherein $R_4$ is a biphenyl radical.

27. The process of claim 15 wherein X is a carbonyl derived from benzophenone tetracarboxylic dianhydride.

28. The process of claim 15 wherein X is a hexafluoroisopropylidene group derived from hexafluoroisopropylidene bisphthalic dianhydride.

29. Fibers impregnated with effective amounts of the polyimide-forming monomeric solution of claim 1 having an extended shelf-life at temperatures ranging up to 80° C.

30. The impregnated fibers of claim 29 wherein the fibers are selected from the Group consisting of glass, carbon, polyamide fibers and mixtures thereof.

31. The impregnated fibers of claim 29 wherein the polyimide-forming monomeric solution comprises a mono-secondary alkyl ester-acid derived from nadic anhydride and a secondary alkyl diester-diacid derived from pyromellitic dianhydride.

32. The impregnated fibers of claim 29 wherein the monoalkyl ester-acid of nadic anhydride is derived from isopropanol.

33. The impregnated fibers of claim 29 wherein the diester-diacid is derived from benzophenone tetracarboxylic dianhydride.

34. The impregnated fibers of claim 29 wherein the diester-diacid is derived from hexafluoroisopropylidene bisphthalic dianhydride.

35. A process of preparing polyimide reinforced fibers which comprises impregnating said fibers with effective amounts of the polyimide-forming monomeric solution of claim 1 and heating said impregnated fibers to curing temperatures.

36. The process of claim 35 wherein the reinforced fibers are selected from the Group consisting of glass, carbon, polyamide fibers and mixtures thereof.

37. The process of claim 36 wherein the fibers are carbon fibers.

38. Polyimide reinforced fibers obtained by the process of claim 35.

39. Polyimide-reinforced fibers obtained by the process of claim 36.

40. Polyimide-reinforced fibers obtained by the process of claim 37.

* * * * *